US010369994B2

(12) United States Patent
Myers et al.

(10) Patent No.: US 10,369,994 B2
(45) Date of Patent: Aug. 6, 2019

(54) REAR CAMERA STUB DETECTION

(71) Applicant: Ford Global Technologies, LLC, Dearborn, MI (US)

(72) Inventors: Scott Vincent Myers, Camarillo, CA (US); Alexandru Mihai Gurghian, Palo Alto, CA (US); Ashley Elizabeth Micks, Mountain View, CA (US); Alexandro Walsh, Mountain View, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 170 days.

(21) Appl. No.: 15/215,368

(22) Filed: Jul. 20, 2016

(65) Prior Publication Data

US 2018/0022347 A1 Jan. 25, 2018

(51) Int. Cl.

| | |
|---|---|
| ***G01C 22/00*** | (2006.01) |
| ***G05D 1/00*** | (2006.01) |
| ***B60W 30/12*** | (2006.01) |
| ***B60W 30/095*** | (2012.01) |
| ***B60W 40/072*** | (2012.01) |

(Continued)

(52) U.S. Cl.

CPC ........ *B60W 30/12* (2013.01); *B60W 30/0956* (2013.01); *B60W 40/072* (2013.01); *B60W 50/00* (2013.01); *G01S 13/867* (2013.01); *G01S 13/89* (2013.01); *G01S 15/025* (2013.01); *G01S 15/89* (2013.01); *G01S 17/023* (2013.01); *G01S 17/89* (2013.01); *G06K 9/00201* (2013.01); *G06K 9/00798* (2013.01); *G06K 9/4628* (2013.01); *G06K 9/627* (2013.01); *G06K 9/66* (2013.01); *G08G 1/0962* (2013.01); *G08G 1/165* (2013.01); *G08G 1/167* (2013.01); *B60W 2050/0014* (2013.01); *B60W 2420/40* (2013.01); *B60W 2420/42* (2013.01); *B60W 2420/52* (2013.01); *B60W 2420/54* (2013.01); *B60W 2550/143* (2013.01)

(58) Field of Classification Search

None

See application file for complete search history.

(56) References Cited

U.S. PATENT DOCUMENTS

| | | | |
|---|---|---|---|
| 7,706,978 | B2 | 4/2010 | Schiffmann |
| 8,306,733 | B2 | 11/2012 | Shikimachi |

(Continued)

FOREIGN PATENT DOCUMENTS

| | | |
|---|---|---|
| JP | S5960214 | 4/1984 |
| JP | H01284708 | 11/1989 |
| JP | 4752836 B2 | 8/2011 |

*Primary Examiner* — Anne M Antonucci
*Assistant Examiner* — Kenny A. Taveras
(74) *Attorney, Agent, or Firm* — David R. Stevens; Stevens Law Group

(57) ABSTRACT

A method for detecting stubs or intersecting roadways includes receiving perception data from at least two sensors. The at least two sensors include a rear facing camera of a vehicle and another sensor. The perception data includes information for a current roadway on which the vehicle is located. The method includes detecting, based on the perception data, an intersecting roadway connecting with the current roadway. The method also includes storing an indication of a location and a direction of the intersecting roadway with respect to the current roadway.

20 Claims, 7 Drawing Sheets

(51) Int. Cl.

| | |
|---|---|
| ***B60W 50/00*** | (2006.01) |
| ***G01S 13/89*** | (2006.01) |
| ***G01S 15/89*** | (2006.01) |
| ***G01S 17/89*** | (2006.01) |
| ***G06K 9/00*** | (2006.01) |
| ***G06K 9/66*** | (2006.01) |
| ***G08G 1/16*** | (2006.01) |
| ***G01S 17/02*** | (2006.01) |
| ***G01S 15/02*** | (2006.01) |
| ***G01S 13/86*** | (2006.01) |
| ***G06K 9/46*** | (2006.01) |
| ***G06K 9/62*** | (2006.01) |
| ***G08G 1/0962*** | (2006.01) |

(56) References Cited

U.S. PATENT DOCUMENTS

| | | | | |
|---|---|---|---|---|
| 8,457,827 | B1 * | 6/2013 | Ferguson | G05D 1/00 701/23 |
| 8,660,795 | B2 | 2/2014 | Shimomura | |
| 8,918,281 | B2 | 12/2014 | Tanaka | |
| 2010/0179755 | A1 | 7/2010 | Kohno | |
| 2010/0246889 | A1 | 9/2010 | Nara et al. | |
| 2011/0172913 | A1 | 7/2011 | Nakamura | |
| 2016/0054140 | A1 * | 2/2016 | Breed | G01C 21/3611 701/408 |
| 2017/0116485 | A1 * | 4/2017 | Mullen | B60R 1/00 |

* cited by examiner

REAR CAMERA STUB DETECTION

TECHNICAL FIELD

The present disclosure relates to assisted or automated driving systems, methods, and devices and more particularly relates to stub detection using a rear camera.

BACKGROUND

Automobiles provide a significant portion of transportation for commercial, government, and private entities. Autonomous vehicles and driving assistance systems are currently being developed and deployed to provide safety features, reduce an amount of user input required, or even eliminate user involvement entirely. For example, some driving assistance systems may drive a vehicle from one location to another without user input or may provide assistance to a user as a human drives. These systems often require knowledge of an environment, such as available roadways, to know what routes are available and/or to quickly pull up information or make decisions to assist a human driver.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION OF PREFERRED EMBODIMENTS

Figure 1:
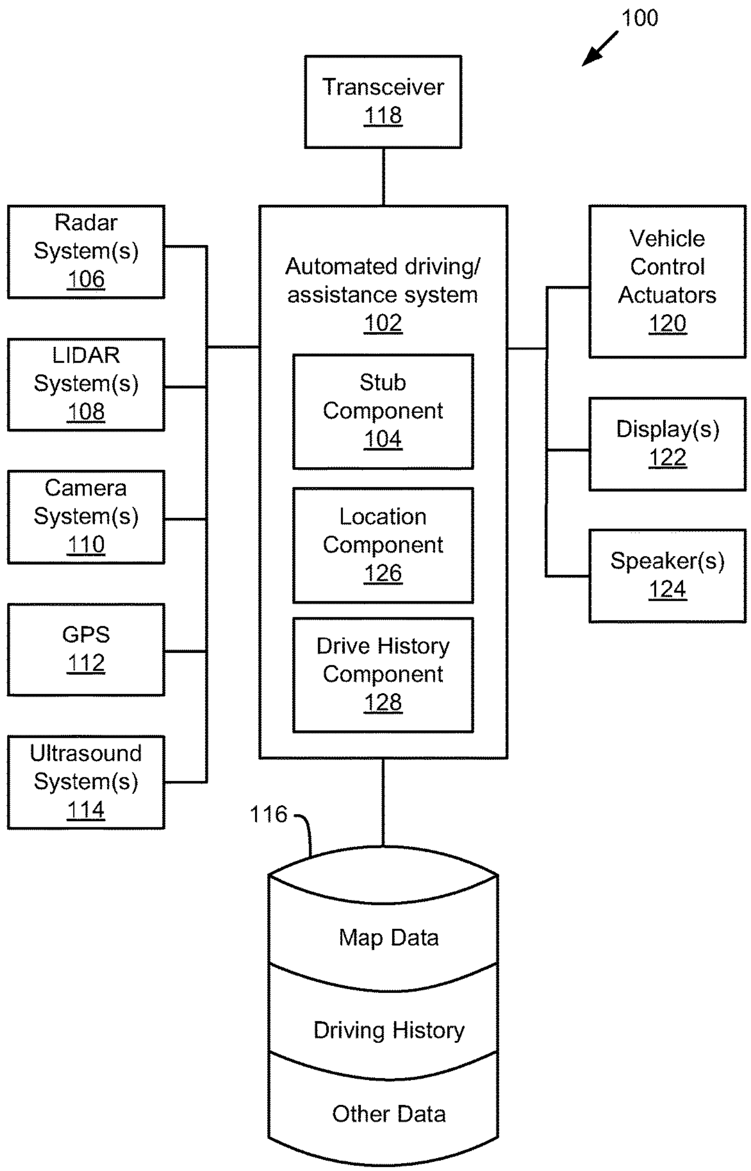
FIG. 1 is a schematic block diagram illustrating an implementation of a vehicle control system that includes an automated driving/assistance system.

An automated driving system or driving assistance system may use data from a plurality of sources during decision making, navigation, or driving to determine optimal paths or maneuvers. For example, an automated driving/assistance system may include sensors to sense a driving environment in real time and/or may access maps or local or remote data storage to obtain specific details about a current location or locations along a planned driving path. In one embodiment, details about locations that a parent vehicle has driven may be stored in a drive history database for later access. For example, when a vehicle returns to a location for which there is drive history data, the automated driving/assistance system may pull data from the drive history to obtain details about a location which may not (yet) be apparent to a driver or to vehicle sensors.

Because drive history data can be extremely helpful to an automated driving/assistance system, Applicant has recognized benefits in using available sensors and computing power on a vehicle to obtain drive history data. In the present application, Applicant discloses systems, methods, and devices for obtaining information about connecting cross-streets, driveways, or other possible places for a vehicle to enter or exit a roadway using a rear camera or back-up camera of a vehicle. This data may be stored in a drive history for later use. According to one example embodiment, a system includes a perception data component, a stub detection component, and a storage component. The perception data component is configured to receive perception data from at least two sensors. The at least two sensors include a rear facing camera of a vehicle and the perception data includes information for a region behind the vehicle on a current roadway on which the vehicle is located. The stub detection component is configured to detect, based on the perception data, an intersecting roadway connecting with the current roadway. The storage component is configured to store an indication of a location and a direction of the intersecting roadway with respect to the current roadway.

Rearward facing cameras on vehicles are typically used for backing up and are idle or unused while a vehicle is moving forward. Embodiments disclosed herein use rear cameras to examine a roadway behind a vehicle to detect stubs. The term "stub" is given to mean a location where a known driving surface branches or connects to a specific road, even if no more information beside the existence of the connection is known. The stubs may include portions of roadways, driveways, or other driving surfaces that connect with a roadway on which the vehicle is currently located or driving. For example, the stubs may include locations where a vehicle can be driven to enter or exit the current roadway. For example, some embodiments may cause the rear camera to capture video/images at any time the vehicle is powered on or moving (forward or backward). Information about the entries or exits may be used to inform an automatic driving/assistance system or to update a drive history database.

In one embodiment, the rear view camera detects possible entryways, exits, and cross streets not currently known by a drive history because they have yet to be traversed. A lane detection algorithm, which may use a deep neural network (DNN), may be used to discover lanes behind the vehicle (e.g., using a rear facing camera image). To detect stubs, gaps in lane markings may be examined. For example, road boundary markings may continue along a side of a roadway and stop for a brief distance where an intersection or cross-road is located. In one embodiment, LIDAR and rear camera data may be combined in a sensor-fusion setup in order to improve robustness. For example, LIDAR data may provide additional information or may be used in situations where no lane markers are visible in the camera image, but the shoulders of the road can be detected using LIDAR. For example, gaps or variations in the shoulders are hints for road stubs. Similarly, the presence, absence or variations in barriers or curbs near a roadway may also be used to identify locations where entries or exits to a roadway are present.

When an intersection, entry, or exit has been detected, the system may determine the location and/or direction of the intersection, entry, or exit. For example, the location may include a GPS location, a location on a map, a distance from a feature of a roadway (e.g., another intersection), or the like. The direction may indicate which side of a current roadway that the stub (intersection, entry, or exit) is located. For example, the direction may indicate that the stub is located on a specific side of the current roadway. The locality and directionality may be stored in the drive history database for subsequent retrieval. On a subsequent trip near this location, the existence of these stubs, cross streets and exits can be retrieved from drive history and used to refine projection of possible paths to other controllers in the vehicle. In one embodiment, the existence of stubs or intersecting roadways may be stored at a remote location so that vehicles can leverage data gathered by themselves as well as by other vehicles.

The existence of the cross streets or stubs may be used for routing. For example, they may be used to determine the possible routes that may be traversed by a vehicle. The existence of the cross streets or stubs may be used for point of interest detection, and other functions as needed. For example, based on the existence of a stub, entry, or exit, a system may check to see if there is any point of interest on a map or in a database that is near that stub, entry, or exit. A human or automated driving/assistance system may be notified of the point of interest so that the human or automated driving/assistance system can determine whether they want to proceed to that location or load additional drive history, map data, or path projection data for that location.

Further embodiments and examples will be discussed in relation to the figures below.

Referring now to the figures, FIG. 1 illustrates an example vehicle control system 100. The vehicle control system 100 includes an automated driving/assistance system 102. The automated driving/assistance system 102 may be used to automate or control operation of a vehicle or to provide assistance to a human driver. For example, the automated driving/assistance system 102 may control one or more of braking, steering, acceleration, lights, alerts, driver notifications, radio, or any other driving or auxiliary systems of the vehicle. In another example, the automated driving/assistance system 102 may not be able to provide any control of the driving (e.g., steering, acceleration, or braking), but may provide notifications and alerts to assist a human driver in driving safely. For example, the automated driving/assistance system 102 may include one or more controllers that provide or receive data over a controller bus and use the data to determine actions to be performed and/or provide instructions or signals to initiate those actions. The automated driving/assistance system 102 may include a stub component 104 that is configured to detect entries or exits for roadways, driveways, parking lots, or any other driving surface that connect to a current roadway based on images or video from a rear facing camera of a vehicle.

The vehicle control system 100 also includes one or more sensor systems/devices for detecting a presence of nearby objects, lane markers, and/or or determining a location of a parent vehicle (e.g., a vehicle that includes the vehicle control system 100). For example, the vehicle control system 100 may include radar systems 106, one or more LIDAR systems 108, one or more camera systems 110, a global positioning system (GPS) 112, and/or ultrasound systems 114. The vehicle control system 100 may include a data store 116 for storing relevant or useful data for navigation and safety such as map data, a driving history (i.e., drive history), or other data. The vehicle control system 100 may also include a transceiver 118 for wireless communication with a mobile or wireless network, other vehicles, infrastructure, cloud or remote computing or storage resources, or any other communication system.

The vehicle control system 100 may include vehicle control actuators 120 to control various aspects of the driving of the vehicle such as electric motors, switches or other actuators, to control braking, acceleration, steering or the like. The vehicle control system 100 may include one or more displays 122, speakers 124, or other devices so that notifications to a human driver or passenger may be provided. A display 122 may include a heads-up display, dashboard display or indicator, a display screen, or any other visual indicator which may be seen by a driver or passenger of a vehicle. The speakers 124 may include one or more speakers of a sound system of a vehicle or may include a speaker dedicated to driver notification. The vehicle control actuators 120, displays 122, speakers 124, or other parts of the vehicle control system 100 may be controlled by one or more of the controllers of the automated driving/assistance system 102.

In one embodiment, the automated driving/assistance system 102 is configured to control driving or navigation of a parent vehicle. For example, the automated driving/assistance system 102 may control the vehicle control actuators 120 to drive a path within lanes on a road, parking lot, driveway or other location. For example, the automated driving/assistance system 102 may determine a path based on information or perception data provided by any of the components 106-118. The sensor systems/devices 106-110 and 114 may be used to obtain real-time sensor data so that the automated driving/assistance system 102 can assist a driver or drive a vehicle in real-time. In one embodiment, the automated driving/assistance system 102 also uses information stored in a driving history (locally or remotely) for determining conditions in a current environment. The automated driving/assistance system 102 may implement one or more algorithms, applications, programs, or functionality that drive or assist in driving of the vehicle.

In one embodiment, the camera systems 110 include a rear facing camera, such as a backup-camera. The camera systems 110 may include cameras facing in different directions to provide different views and different fields of view for areas near or around the vehicle. For example, some cameras may face forward, sideward, rearward, at angles, or in any other direction. In one embodiment, images from a rear camera may be used to determine a number of lanes, connecting roadways, or the like behind a vehicle along a current roadway of the vehicle.

The automated driving/assistance system 102 may also include a location component 126 and a drive history component 128. The location component 126 may determine a current location of the vehicle in which the system 100 is located. For example, the location component 126 may receive location information from the GPS 112 and/or the transceiver 118 that indicates a location of the vehicle. The drive history component 128 is configured to retrieve data from a drive history (i.e., driving history) and provide it to other controllers or portions of the system 100. For example, data in a drive history (stored locally in the data store 116 or remotely stored at a location accessible over a network using the transceiver 118) may be retrieved for a current or future location to inform the automated driving/assistances system 102 of road or driving conditions. In one embodiment, the drive history component 128 is configured to retrieve drive history data from a remote storage location.

The drive history may indicate the presence of connecting roads or driving surfaces. In one embodiment, the drive history component 128 is configured to broadcast road stubs, or connecting driving surfaces, near the current location or along a route for the vehicle to one or more vehicle controllers of an automated driving system or driving assistance system. For example, the controllers may use the data from the drive history to determine how to control the vehicle to drive a section of road or prepare for the possibility of a turn made or to be made by a human driver.

It will be appreciated that the embodiment of FIG. 1 is given by way of example only. Other embodiments may include fewer or additional components without departing from the scope of the disclosure. Additionally, illustrated components may be combined or included within other components without limitation.

Figure 2:
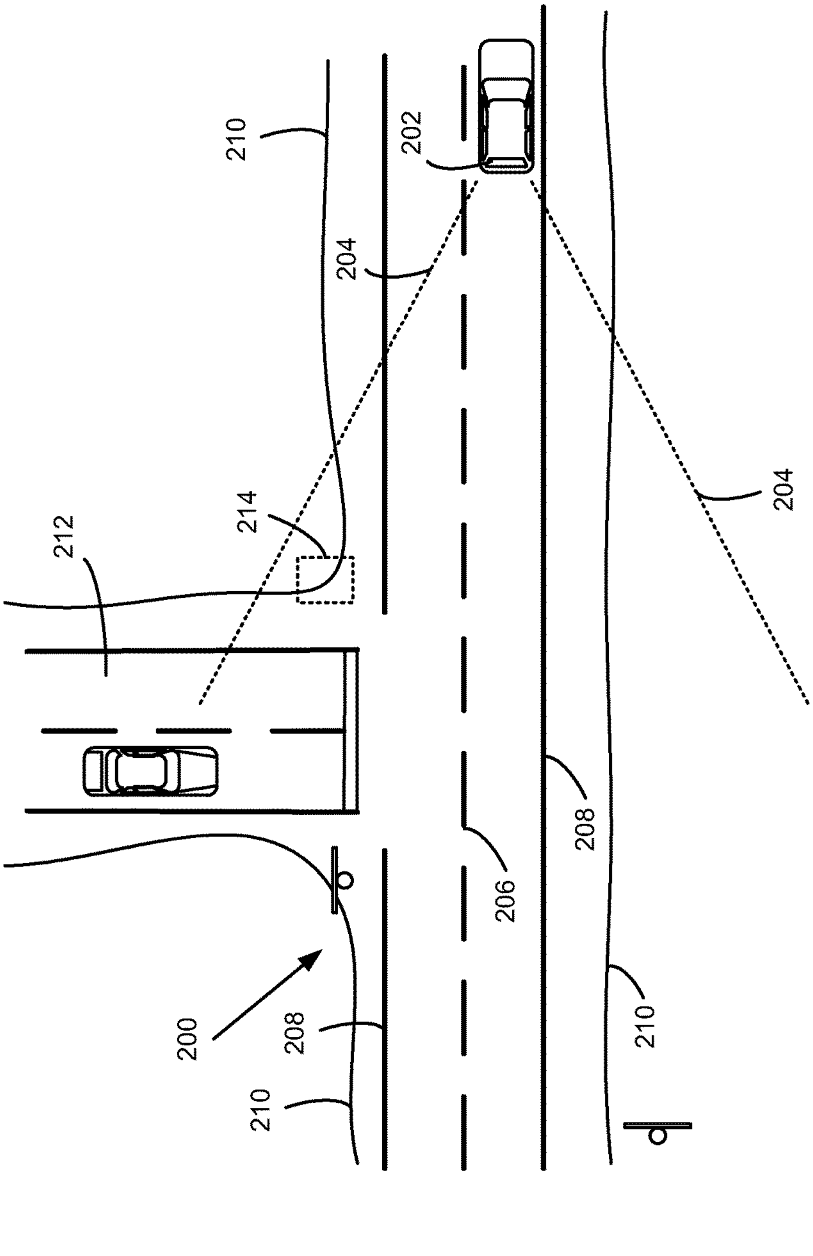
FIG. 2 illustrates a top view of an example road environment.

FIG. 2 illustrates a top view of a vehicle 202 on a roadway 200. The vehicle 202 includes a rear facing camera, and/or other sensors, that capture data behind the vehicle 202 within a field of view 204. The field of view 204 may correspond to a backup camera, LIDAR system, radar system, and/or any other sensor or perception system. Based on images or other type of data captured within the field of view 204, the stub component 104 may detect/locate connections between the roadway 200 and any side roads, driveways, entries, exits, or the like. For example, the side road 212 may be detected based on images and/or other perception data.

In one embodiment, a rear facing camera may produce images of a region of the roadway 200 behind the vehicle 202. Other sensors may obtain other types of perception data. Based on the images or other perception data, the stub component 104 may detect road markings, shoulders, curbs, barriers, driving surfaces, and/or the like. For example, the stub component 104 may detect markings such as center line markings 206, road boundary markings 208, lane divider markings, rumble strips, or the like. As another example, the stub component 104 may detect a shoulder edge 210. A shoulder edge may include an edge of pavement (such as concrete, asphalt, or the like) or the edge of a dirt or maintained area neighboring the pavement. The shoulder edge 210 may be visible in images, but may also present a boundary between different textures or reflectivity of material or have a different height or three-dimensional shape detectable by LIDAR, radar, or other perception data.

Based on the presence, absence or variation in road markings, shoulders, curbs, barriers, driving surfaces, and/or the like, the stub component 104 may identify locations of stubs or connecting driving surfaces. For example, in FIG. 2, the side road 212 connects into the roadway 200. At the location of connection, road boundary markings 208 are not present so the stub component 104 may determine that an entry, exit, or connecting road is present at that location. Similarly, the shoulder edge 210 also varies at the location of the side road 212. For example, the shoulder edge moves away from the roadway to follow the side road 212. The stub component 104 may detect a corner 214 or break in the shoulder 210 and determine that a side road, driveway, or the like is present at that location. The stub component 104 may generate and store an indication that a stub exists at that location and is on a specific side of the roadway 200. In one embodiment, curbs or barriers located near a roadway may also be used to determine whether a stub or other entry or exit is present at a specific location.

Road markings may include any type of lane or road marking. The markings may include mechanical or non-mechanical markings. Mechanical markings may include reflectors, rumble strips, or the like. Non-mechanical markings may include colored lines or markings (white, yellow, etc.) created with paint, plastics, tape, epoxy, or the like.

In one embodiment, a stub component 104 is configured to detect and determine a number of lanes on the roadway 200. It is important to note that images captured using a rear facing camera obtain information that may be reversed from that in a forward facing camera or from the perspective of a human driver. For example, if a center line is generally to the left of a vehicle in a specific driving location, a rear facing camera may capture images showing the center line in a right side of the image. Thus, all lane number, lane positioning, and lane detection algorithms that use data from rear facing cameras may need to reverse orders or detection rules in order to reflect a common format from other sensors or from the perspective of a driver.

The stub component 104 may use the presence of rumble strips, as well as a marking color (white, yellow, etc.) or pattern (broken or solid line) to determine boundaries of a roadway (or outermost lane boundary of a roadway). For example, the road boundary markings 208 include a solid line pattern while the center lane markings 206 include a broken line pattern. Other types of lane markings (such as reflectors) may be identified as road boundary markings, center lines, lane divider, or the like based on color, frequency, or the like. In light of the present disclosure, one of skill in the art will understand that detection of marking type with respect to boundaries may be applied to any type of lane mechanical or non-mechanical marking.

Figure 3:
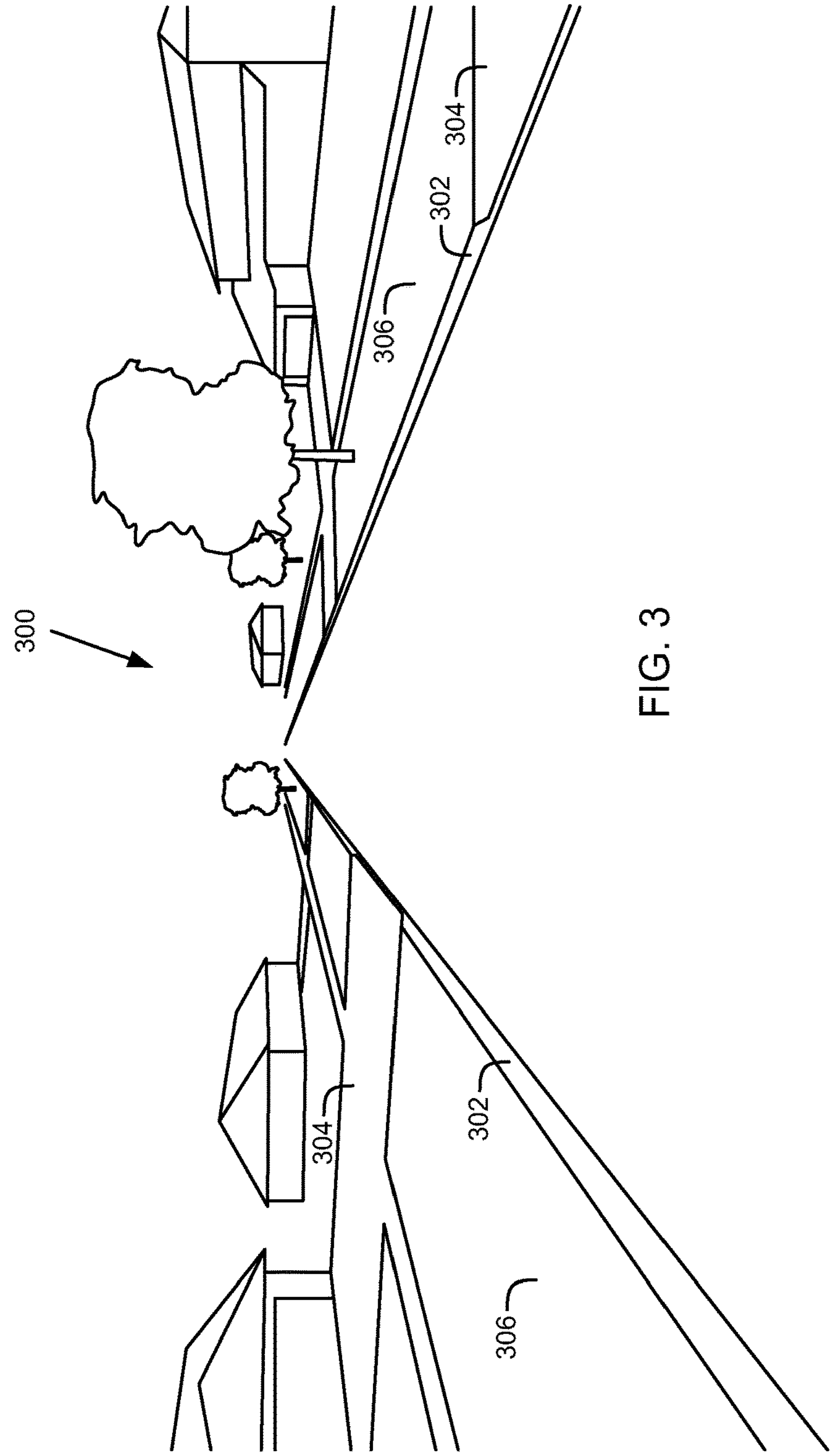
FIG. 3 illustrates a perspective view of an example road environment.

FIG. 3 illustrates a perspective view of a roadway 300 in a residential area, according to one embodiment. The view illustrates what may be captured in an image by a rear facing camera, such as a backup camera, of a vehicle driving through a residential area. Because the roadway 300 does not include traditional mechanical or non-mechanical lane markers, such as lines or reflectors, the presence of entries or exits onto the roadway 300 must be determined based on other factors, such as the presence or height of curbs 302, parking strips 306, or non-driving surfaces. The stub component 104 may determine a height of a curb 302 and any changes in the height. For example, the curb height shrinks or is less where driveways 304 lead into the roadway 300. Similarly, intersecting streets may be detected based on the lack of curbs and/or the continuation of a driving surface in a direction at least partially perpendicular to the roadway 300. In one embodiment, the stub component 104 may also detect parking strips 306 or other areas near the roadway 300 that have a different texture or height than a driving surface of the roadway 300. For example, curbs 302, parking strips 306, driveways, or lack thereof, may be detected on either side of the roadway 300 using images from a rear camera and/or data from another sensing system, such as LIDAR data or radar data. LIDAR data and radar data can be particularly helpful in detecting curbs or other three-dimensional road or environmental features.

In one embodiment, fused data, based on images and other sensor data may be generated to determine a location of curbs, a shoulder, or the like near the roadway. For example, a location of the edge of a roadway may be determined based on image processing techniques such as edge detection or boundary detection or based on LIDAR data.

Figure 4:
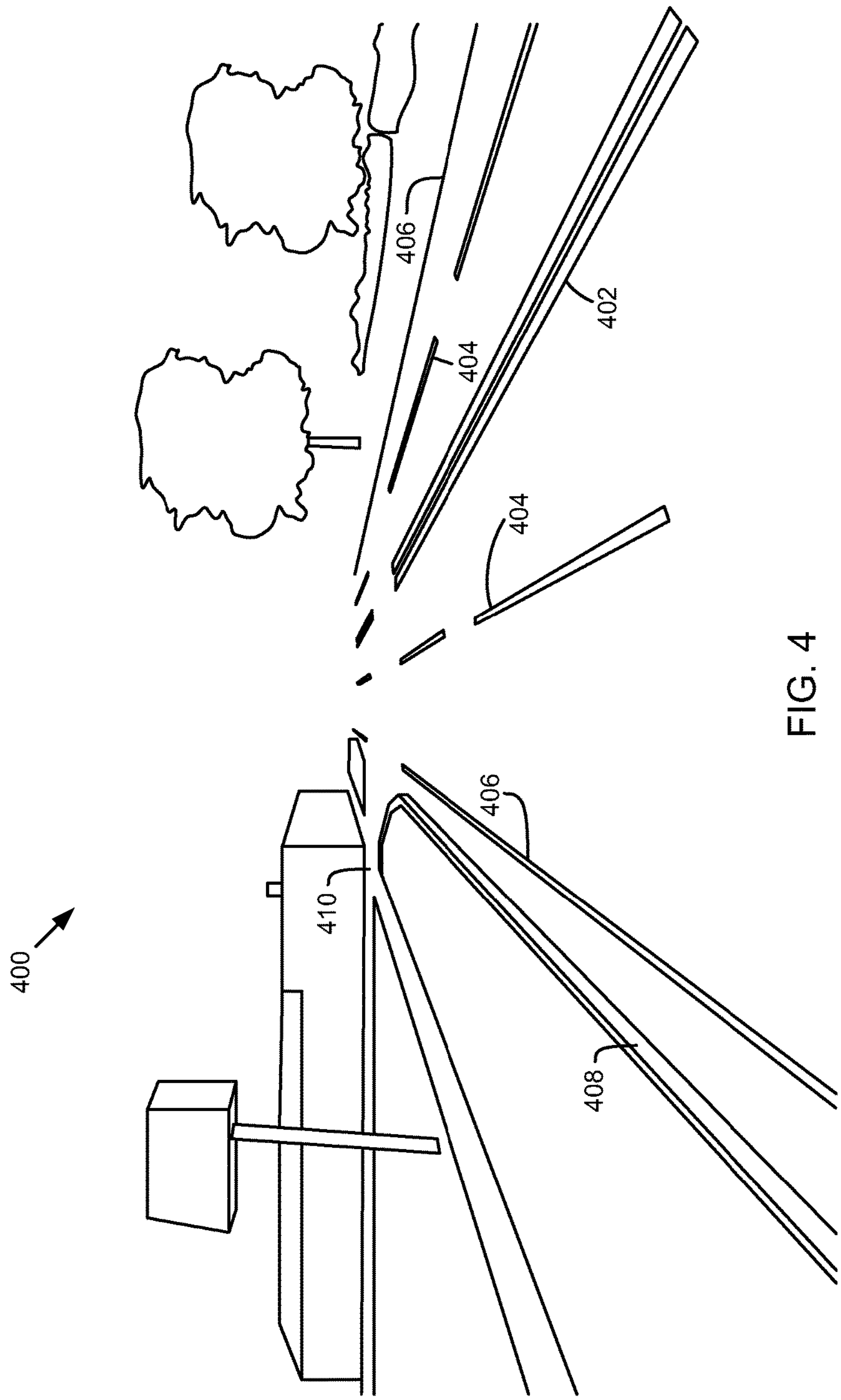
FIG. 4 illustrates a perspective view of another example road environment.

FIG. 4 illustrates a perspective view of a roadway 400 in a commercial environment, according to one embodiment. The view illustrates what may be captured in an image by a rear facing camera, such as a backup camera, of a vehicle. Similarly, a LIDAR or radar system may capture information about one or more of the features of the roadway 400 or in the environment of the roadway 400. The roadway 400 is a bi-directional roadway with a plurality of markings including center line markings 402, lane divider markings 404, and road boundary markings 406. A curb 408 is located near the roadway 400 and a cross-street 410 intersects with the roadway 400. In one embodiment, a stub component 104 is configured to detect and determine a number of lanes on the roadway 400. For example, the stub component 104 may identify the road boundary markings 406 and, based on the two sets of lane divider markings 404 and center line markings 402, determine that there are four lanes on the roadway.

Based on breaks in the road boundary markings 406, variations in the presence or height of the curb 408, or a continuation of a driving surface, the stub component 104 may determine that a connecting street, driveway, or the like is connected to the roadway 400. For example, the curb 408 and the road boundary markings 406 end at the cross-street 410. Based on the ending of the curb 408 and road boundary markings 406, the stub component 104 may determine that there is a cross-street 410 at that location. In one embodiment, the stub component 104 may determine that there is a road or street at the location of the break or ending of the curb 408 and road boundary markings 406 even if an available map does not include any information about the cross-street 410. The presence of the cross-street 410 may be stored in the drive history for later access.

Figure 5:
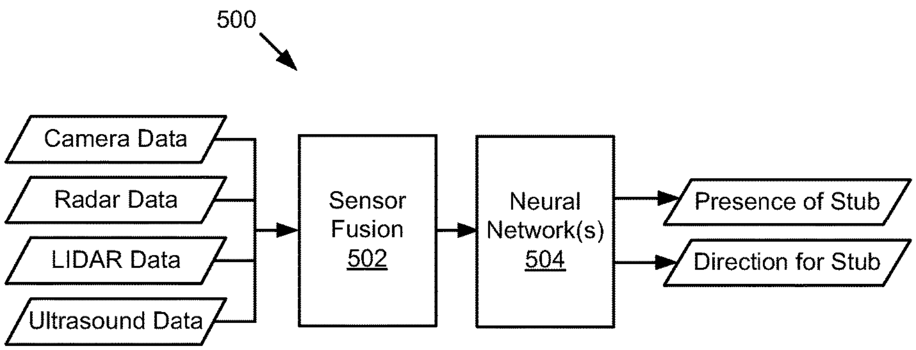
FIG. 5 is a schematic block diagram illustrating data flow for detecting a stub or intersecting roadway, according to one implementation.

FIG. 5 is a schematic block diagram illustrating data flow for a method 500 for detecting a presence and direction of connecting streets or driving surfaces. A plurality of types of perception data including camera data, radar data, LIDAR data, and/or ultrasound data may be received combined for sensor fusion 502. The camera data may include data from a rear facing camera such as a backup camera. Sensor fusion 502 may generate information about lane marking location, curb location, a road shoulder, or the location of any other environmental object or feature based on combined perception data. For example, if only camera data and LIDAR data is received, then a location for a lane marking may be determined based on an average or other combination of camera and LIDAR data. The sensor fusion 502 may use averages or weighted averages for different data types to determine fused or combined data. If only one type of data is received, the sensor fusion may pass through that raw data or modify the raw data to match a format expected by neural networks 504. The neural networks 504 may receive the raw or fused data and process it to generate an indication of a presence of a stub (e.g., a connecting road or driving surface) and a direction for the stub with respect to a current roadway. For example, the direction of the stub may indicate whether it is on a left or right side of a road with respect to a current direction a vehicle is facing.

The neural networks 504 may include one or more networks that compute one or more outputs including an indication of a presence of a stub and/or a direction for the stub. Because rear facing camera data may be used, the presence of stubs may be based on a section of roadway that the vehicle is already passed over. However, storing an indication of the presence and direction of a stub may be retrieved at a later time when a vehicle is approaching or re-approaching location where the stub was detected. In one embodiment, the neural networks 504 include one or more deep neural networks that have been trained for detecting a stubs and/or the direction of stubs. In one embodiment, the presence of the stub may be associated with a current location of the vehicle. Because the stub may be some location behind a vehicle, the stub location may be associated with a current location offset by a predetermined distance. In one embodiment, a neural network may provide an output indicating a distance of the stub from the vehicle.

Figure 6:
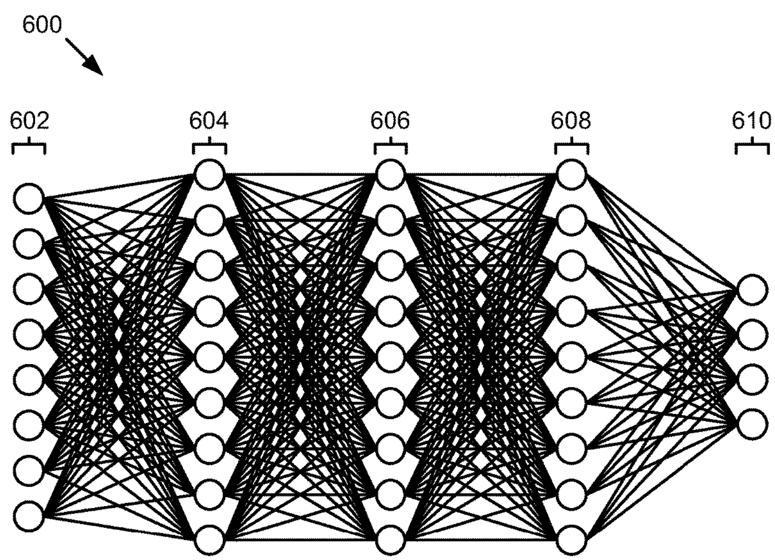
FIG. 6 is a schematic diagram illustrating example configuration of a deep neural network, according to one implementation.

FIG. 6 is a schematic diagram illustrating configuration of a deep neural network 600. Deep neural networks have gained attention in the recent years, as they have outperformed traditional machine learning approaches in challenging tasks like image classification and speech recognition. Deep neural networks are feed-forward computational graphs with input nodes (such as input nodes 602), one or more hidden layers (such as hidden layers 604, 606, and 608) and output nodes (such as output nodes 610). For classification of contents or information about an image, pixel-values of the input image are assigned to the input nodes, and then fed through the hidden layers 604, 606, 608 of the network, passing a number of non-linear transformations. At the end of the computation, the output nodes 610 yield values that correspond to the class inferred by the neural network. The number of input nodes 602, hidden layers 604-608, and output notes 610 is illustrative only. For example, larger images may include an input node 602 for each pixel, and thus may have hundreds, thousands, or other number of input notes.

According to one embodiment, a deep neural network 600 of FIG. 6 may be used to classify the content(s) of an image into four different classes: a first class, a second class, a third class, and a fourth class. According to the present disclosure, a similar or differently sized neural network may be able to output a value indicating a number of lanes in an image. For example, the first class may correspond to the presence/absence of a connecting road or stub, the second class may correspond to a direction of the road or stub (e.g., near zero for right and near one for left), the third and fourth class may indicate a distance from a rear of a vehicle to any detected road or stub. For example, the third and fourth class may be treated as binary output to indicate one of four distance ranges in which the stub falls. This is illustrative only as a neural network to classify the presence, direction, and/or distance of stubs based on an image may include hundreds or thousands of pixels and may need to include a larger number of outputs to provide more accurate indications of distance. Thus, a neural network to classify the presence, direction, and/or distance to a stub may require hundreds or thousands of nodes at an input layer and/or more than four output nodes.

For example, feeding a raw image of the roadway 200 into the network at the point in time depicted in FIG. 2 may yield a high probability of a presence of a stub, directionality to the left of the vehicle 202, and a distance indicating a distance between the side road 212 and the vehicle 202. Similar techniques or principles may be used to infer information about the presence and locations of road markings, lanes, or the like.

In order for deep neural network to be able to distinguish between any desired classes, the neural network needs to be trained based on examples. For example, to create a deep neural network that is able to detect and classify the presence, directionality, and/or distance of stubs in a picture, a large amount of example images (hundreds to thousands for roadways with different types of stubs and distances) with a label assigned to each image that corresponds to the presence, directionality, and/or distance of stubs may be needed. The labeled data can be a large challenge for training deep neural networks as humans are often required to assign labels to the training images (which often go into the millions). Thus, the time and equipment to acquire the image as well as hand label them can be expensive. Once the images with labels (training data) are acquired, the network may be trained. One example algorithm for training includes the back propagation-algorithm that uses the images, including the large number of images with labels. The back propagation-algorithm can take several hours, days, or weeks to be performed.

Figure 7:
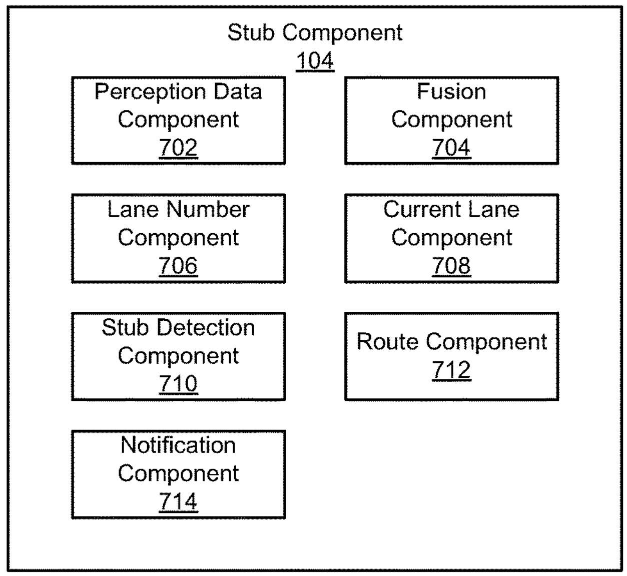
FIG. 7 is a schematic block diagram illustrating example components of a stub component, according to one implementation.

Turning to FIG. 7, a schematic block diagram illustrating components of a stub component 104, according to one embodiment, is shown. The stub component 104 includes a perception data component 702, a fusion component 704, a lane number component 706, a current lane component 708, a stub detection component 710, a route component 712, and a notification component 714. The components 702-714 are given by way of illustration only and may not all be included in all embodiments. In fact, some embodiments may include only one or any combination of two or more of the components 702-714. Some of the components 702-714 may be located outside the stub component 104, such as within the automated driving/assistance system 102 or elsewhere.

The perception data component 702 is configured to obtain or receive perception data from one or more sensors or sensing systems of a vehicle or a vehicle control system. In one embodiment, the perception data component 702 receives perception data that includes information about an environment of a vehicle or vehicle control system. Example perception data includes data from LIDAR, radar, camera, ultrasound, infrared, or other systems. In one embodiment, the perception data component 702 is configured to receive perception data from at least two sensors or sensing systems. In one embodiment, at least one of the sensors or sensing systems includes a rear facing camera of a vehicle. Data from other sensors may also be received such as data from a LIDAR, radar, ultrasound, infrared, or other system. The perception data may include information for a region behind the vehicle on a current roadway on which the vehicle is located.

The fusion component 704 is configured to perform data fusion with perception data obtained by the perception data component 702. For example, the fusion component 704 may populate fields or entries expected by one or more of the other components 702, 706-714 with data from the perception data. For example, if an image is expected (but may not be required) by the lane number component 706 or stub detection component 710, the fusion component 704 may provide an image into a table or matrix that is to be provided to the lane number component 706 or stub detection component 710. Similarly, if LIDAR data could be used by a component, the fusion component 704 may provide the LIDAR data into a different field or area of the table or matrix. The fusion component 704 may assemble perception data from different data sources for use by a lane number component 706, current lane component 708, and/or a stub detection component 710 for processing using a neural network or other machine learning algorithm or model.

In one embodiment, the fusion component 704 is configured to generate fused sensor data based on the perception data from at least two sensors. For example, the fused sensor data may include a location of a lane marking, a location of a curb or barrier, a location of a shoulder or an edge of a shoulder, a number of lanes, or the like. For example, the fusion component 704 may determine the presence or location of one or more lane lines based on data from multiple sensors. For example, data from one sensor may indicate the presence of a lane marking with high confidence while data from another sensor may indicate the presence of a lane marking with low or medium confidence. Based on the combined data, the fusion component 704 may determine that a lane marking is present. Similarly, data from one sensor may indicate a first location for a lane marking or curb while data from another sensor may indicate that the lane marking or curb has a slightly different location. The fusion component 704 may determine a new or modified location that has been computed based on the combined data.

The lane number component 706 is configured to determine a number of lanes on a roadway based on the perception data. In one embodiment, the lane number component 706 uses perception data that has been fused or processed by the fusion component 704. In another embodiment, the lane number component 706 uses raw data or data that has not been fused or processed by the fusion component 704. In one embodiment, the lane number component 706 includes one or more neural networks that have been trained to detect a number of lanes within an image, LIDAR frame, radar frame, or other frame or unit of sensor data. Other embodiments may include other types of machine learning algorithms or models for determining the number of lanes. The lane number component 706 may receive the perception data as input and provide an output that indicates a number of inferred lanes. The output of the neural network or other machine learning algorithm may indicate to other components or systems how many lanes were present within a field of view of the perception sensors when the perception data was captured/obtained.

The current lane component 708 is configured to determine a current lane of the vehicle. For example, the current lane component 708 may determine a current lane, within the number of lanes detected by the lane number component, of a vehicle based on the perception data. For example, the current lane component 708 may determine, based on angles formed by lane lines or consecutive lane markers, location within an image or LIDAR frame, or the like, a current lane of the vehicle. The current lane may include a number indicating which of the detected lanes (e.g., from left to right or right to left with respect to the driving direction of the vehicle) the vehicle is located. For example, if the lane number component 706 detects six lanes, the current lane component 708 may output a "1" to indicate that the vehicle is in the right-most lane, a "2" to indicate that the vehicle is in the middle lane, or a "3" to indicate that the vehicle is in a left most lane. This configuration is given by way of example only and other types of output may be provided in other embodiments within the scope of the present disclosure.

According to one embodiment, the current lane component 708 uses a deep neural network that has been trained to determine the current lane. For example, a neural network of the current lane component 708 may receive an image, LIDAR frame, and/or other perception data along with the number of lanes output by the lane number component 706. Based on that input the neural network may output a number or other indication of what lane the vehicle is likely located. The current lane indication may indicate a lane position of the vehicle at a time when the perception data was obtained.

The stub detection component 710 is configured to determine whether an exit or entry connecting a current roadway with a side-road or other driving surface (i.e., stub) is present based on the perception data. In one embodiment, the stub detection component 710 uses perception data that has been fused or processed by the fusion component 704. In another embodiment, the stub detection component 710 uses raw data or data that has not been fused or processed by the fusion component 704. In one embodiment, the stub detection component 710 includes one or more neural networks that have been trained to detect a presence, direction, and/or distance to a stub within an image, LIDAR frame, radar frame, or other frame or unit of sensor data. Other embodiments may include other types of machine learning algorithms or models for determining the presence, direction, or distance. The stub detection component 710 may receive the perception data as input and provide an output that indicates a presence or absence of a stub, a direction (e.g., left or right of the roadway with respect to a current orientation of the vehicle), and/or a distance behind the vehicle to the stub. The output of the neural network or other machine learning algorithm may indicate to other components or systems information about a stub within a field of view of the perception sensors when the perception data was captured or obtained.

In one embodiment, the stub detection component 710 is configured to detect, based on the perception data, an intersecting roadway connecting with the current roadway. The stub detection component 710 may detect that an intersecting roadway is present by detecting one or more of a gap in roadway markings, a break in a shoulder for the current roadway, or a variation or break in curb or barrier height. For example, gaps or breaks in roadway markings, such as lane boundary markings, lane divider markings, road boundary markings, rumble strips, or other markings may occur at intersections or where entries or exits onto the current roadway exist. In one embodiment, a break in a shoulder may occur where another driving surface connects with the current roadway. For example, if a dirt or gravel shoulder is located next to the pavement of a roadway, there may be a break in the dirt or gravel shoulder where a paved roadway, entry, or exit, connects to the current roadway. Curbs or barriers may also have breaks at locations where other vehicles are able to exit or enter the current roadway. The stub detection component 710 may determine a direction for a road that indicates a side of the current roadway on which the intersecting roadway is located. For example, the direction may indicate which direction a vehicle would need to turn to drive from the current roadway onto the intersecting roadway. In one embodiment, the stub detection component 710 is configured to detect an intersecting roadway by detecting a driving surface that connects the current roadway to a one or more of a driveway, parking lot, or cross street.

In one embodiment, machine learning (such as deep neural networks) may be trained using training data to automatically create models that detect these aspects or other aspects that correlate or indicate the presence of a stub. In one embodiment, once a neural network is trained, the neural network may be used to detect intersecting roadways by using a deep neural network to process at least a portion of perception data gathered by the perception data component 702.

The route component 712 is configured to determine a driving route or possible driving routes to be performed by a vehicle or driving system. For example, the route component 712 may determine a driving route to arrive at a destination. The route component 712 may determine one or more possible destinations and then determine one or more possible driving routes to get to one or more of the destinations. In one embodiment, the route component 712 may determine a route based on information in a local or remote drive history. For example, the route component 712 may receive stub information from the drive history component 128 and determine a route based on that information. The stub information may include an indication of a location and direction of the stub. For example, the route component 712 may process the location or direction of the intersecting roadways as at least partially provided by the drive history component 128 to determine a route for the vehicle or detect a point of interest for the vehicle or a passenger. For example, the route component 712 may determine possible destinations based on the stub information and/or may determine routes based on the stub information.

The notification component 714 is configured to report stub information to an automated driving system or driving assistance system. For example, the notification component 714 may provide an indication of a presence, location, and/or direction of a connecting driving surface, roadway, or stub. The notification component 714 may provide any data obtained or determined by the perception data component 702, fusion component 704, the lane number component 706, the current lane component 708, the stub detection component 710, and/or the route component 712. The notification component 714 may provide reports or data to a drive history component 128 or for storage in a local or remote driving history. For example, the notification component 714 or the drive history component 128 may upload an indication of a location and direction of an intersecting roadway to a remote storage location.

Figure 8:
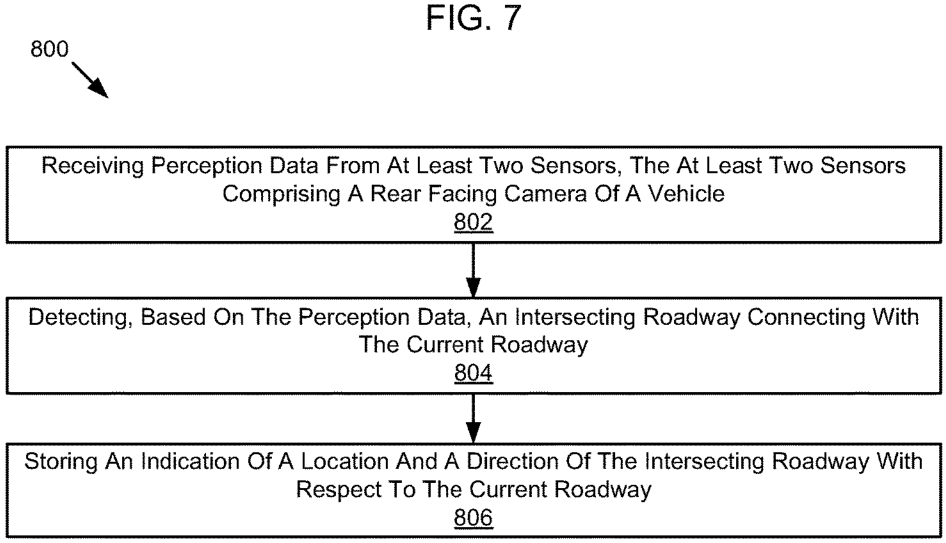
FIG. 8 is a schematic block diagram illustrating a method for detecting stubs or intersecting roadways, according to one implementation.

FIG. 8 is a schematic flow chart diagram illustrating a method 800 for detecting stubs. The method 800 may be performed by a stub component, automated driving/assistances system, or vehicle control system, such as the stub component 104, automated driving/assistances system 102, or vehicle control system 100 of FIG. 1.

The method 800 begins and a perception data component 702 receives at 802 perception data from at least two sensors, the at least two sensors comprising a rear facing camera of a vehicle. The perception data may include information for a current roadway on which the vehicle is located, such as for a region behind the vehicle. For example, the perception data may include information from a rear facing camera with data from one or more of a radar system, LIDAR system, ultrasound sensing system, infrared sensing system, or the like. A stub detection component 710 detects at 804, based on the perception data, an intersecting roadway connecting with the current roadway. The stub detection component 710 may include a deep neural network that receives perception data and provides an indication of a presence, direction, and/or location of a stub viewable/shown in the perception data. In one embodiment, the stub detection component 710 may determine the presence, location, and/or direction of a stub based on fused data from a plurality of sensors or sensor systems. A notification component 714 stores at 806 an indication of a location and a direction of the intersecting roadway with respect to the current roadway. In one embodiment, the notification component 714 stores at 806 the indication of a location and a direction of the intersecting roadway by provided the data to a drive history component 128 or the automated driving/assistance system 102 of FIG. 1.

Figure 9:
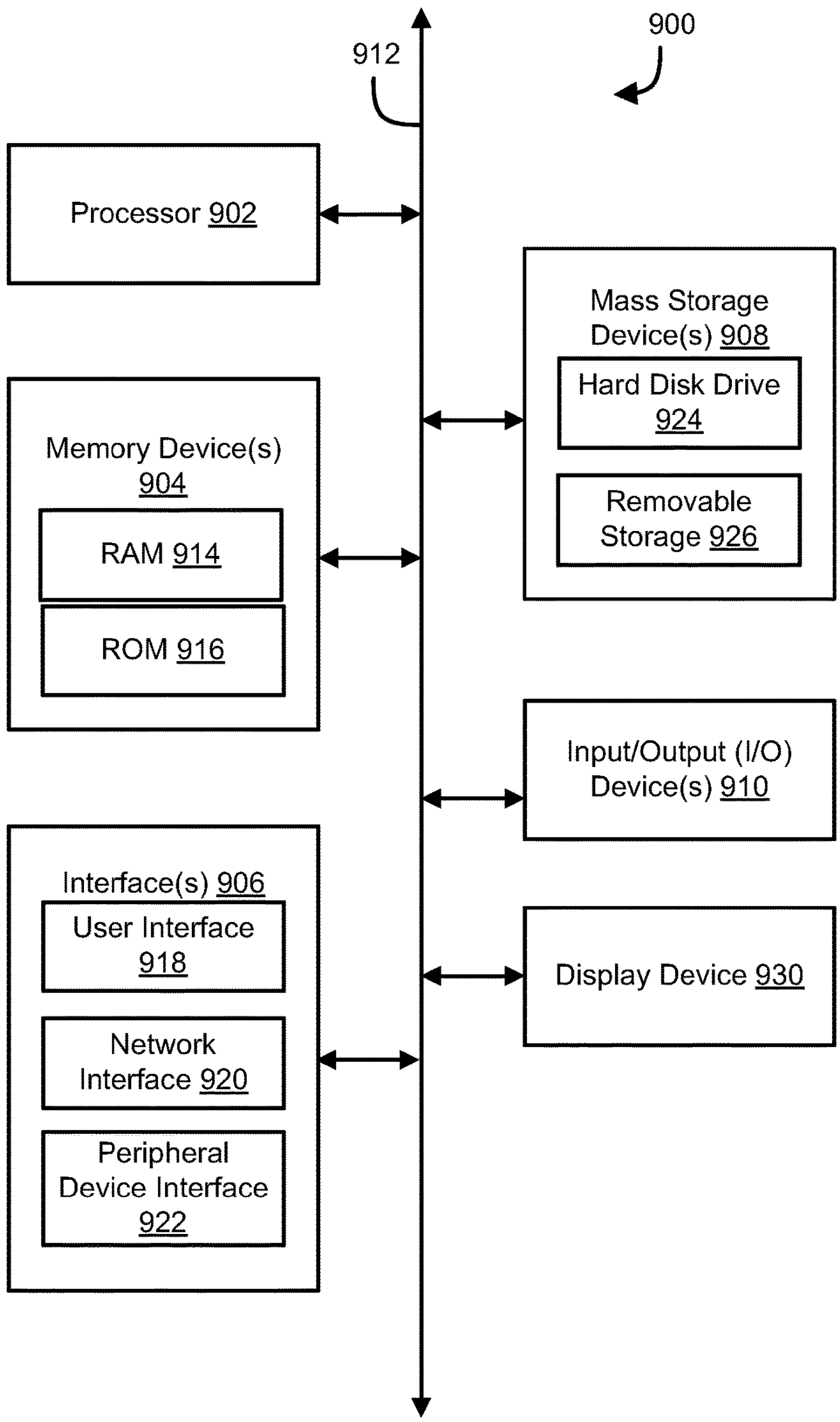
FIG. 9 is a schematic block diagram illustrating a computing system, according to one implementation.

Referring now to FIG. 9, a block diagram of an example computing device 900 is illustrated. Computing device 900 may be used to perform various procedures, such as those discussed herein. Computing device 900 can function as a stub component 104, automated driving/assistance system 102, server, or any other computing entity. Computing device 900 can perform various monitoring functions as discussed herein, and can execute one or more application programs, such as the application programs or functionality described herein. Computing device 900 can be any of a wide variety of computing devices, such as a desktop computer, a notebook computer, a server computer, a handheld computer, tablet computer and the like.

Computing device 900 includes one or more processor(s) 902, one or more memory device(s) 904, one or more interface(s) 906, one or more mass storage device(s) 908, one or more Input/Output (I/O) device(s) 910, and a display device 930 all of which are coupled to a bus 912. Processor(s) 902 include one or more processors or controllers that execute instructions stored in memory device(s) 904 and/or mass storage device(s) 908. Processor(s) 902 may also include various types of computer-readable media, such as cache memory.

Memory device(s) 904 include various computer-readable media, such as volatile memory (e.g., random access memory (RAM) 914) and/or nonvolatile memory (e.g., read-only memory (ROM) 916). Memory device(s) 904 may also include rewritable ROM, such as Flash memory.

Mass storage device(s) 908 include various computer readable media, such as magnetic tapes, magnetic disks, optical disks, solid-state memory (e.g., Flash memory), and so forth. As shown in FIG. 9, a particular mass storage device is a hard disk drive 924. Various drives may also be included in mass storage device(s) 908 to enable reading from and/or writing to the various computer readable media. Mass storage device(s) 908 include removable media 926 and/or non-removable media.

I/O device(s) 910 include various devices that allow data and/or other information to be input to or retrieved from computing device 900. Example I/O device(s) 910 include cursor control devices, keyboards, keypads, microphones, monitors or other display devices, speakers, printers, network interface cards, modems, and the like.

Display device 930 includes any type of device capable of displaying information to one or more users of computing device 900. Examples of display device 930 include a monitor, display terminal, video projection device, and the like.

Interface(s) 906 include various interfaces that allow computing device 900 to interact with other systems, devices, or computing environments. Example interface(s) 906 may include any number of different network interfaces 920, such as interfaces to local area networks (LANs), wide area networks (WANs), wireless networks, and the Internet. Other interface(s) include user interface 918 and peripheral device interface 922. The interface(s) 906 may also include one or more user interface elements 918. The interface(s) 906 may also include one or more peripheral interfaces such as interfaces for printers, pointing devices (mice, track pad, or any suitable user interface now known to those of ordinary skill in the field, or later discovered), keyboards, and the like.

Bus 912 allows processor(s) 902, memory device(s) 904, interface(s) 906, mass storage device(s) 908, and I/O device(s) 910 to communicate with one another, as well as other devices or components coupled to bus 912. Bus 912 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 900, and are executed by processor(s) 902. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

EXAMPLES

The following examples pertain to further embodiments.

Example 1 is a method that includes receiving perception data from at least two sensors. The at least two sensors include a rear facing camera of a vehicle and another sensor. The perception data includes information for a current roadway on which the vehicle is located. The method includes detecting, based on the perception data, an intersecting roadway connecting with the current roadway. The method also includes storing an indication of a location and a direction of the intersecting roadway with respect to the current roadway.

In Example 2, detecting the intersecting roadway in Example 1 includes detecting one or more of: a gap in roadway markings, a break in a shoulder for the current roadway, or a variation or break in curb or barrier height.

In Example 3, detecting the intersecting roadway in any of Examples 1-2 includes detecting using a deep neural network.

In Example 4, the at least two sensors in any of Examples 1-3 include the rear facing camera and one or more of a LIDAR system, a radar system, an ultrasound sensing system, or an infrared camera system.

In Example 5, the direction in any of Examples 1-4 indicates a side of the current roadway on which the intersecting roadway is located.

In Example 6, storing the indication of the location and direction in any of Examples 1-5 includes uploading to a remote storage location accessible over a network.

In Example 7, the method of Example 7 further includes: determining a current location of the vehicle; retrieving drive history data from the remote storage location for the current location, wherein the drive history data indicates a location or direction of intersecting roadways near the current location; and broadcasting the location or direction of intersecting roadways near the current location to one or more vehicle controllers of an automated driving system or driving assistance system.

In Example 8, method of Example 7 further includes processing the location or direction of intersecting roadways to determine a route for the vehicle or detect a point of interest for the vehicle or a passenger.

Example 9 is a system that includes a perception data component, a stub detection component, and a notification component. The perception data component is configured to receive perception data from at least two sensors, the at least two sensors include a rear facing camera of a vehicle. The perception data includes information for a region behind the vehicle on a current roadway on which the vehicle is located. The stub detection component is configured to detect, based on the perception data, an intersecting roadway connecting with the current roadway. The notification component is configured to store an indication of a location and a direction of the intersecting roadway with respect to the current roadway.

In Example 10, wherein the stub detection component in Example 9 is configured to detect the intersecting roadway by detecting one or more of: a gap in roadway markings, a break in a shoulder for the current roadway, or a variation or break in curb or barrier height.

In Example 11, the stub detection component in any of Examples 9-10 is configured to detect the intersecting roadway by detecting using a deep neural network to process at least a portion of the perception data.

In Example 12, the at least two sensors in any of Examples 9-11 include the rear facing camera and one or more of a LIDAR system, a radar system, an ultrasound sensing system, or an infrared camera system, wherein the system comprises the at least two sensors.

In Example 13, the stub detection component in any of Examples 9-12 is configured to detect the direction of the intersecting roadway, wherein the direction indicates a side of the current roadway on which the intersecting roadway is located or connects to the current roadway.

In Example 14, the stub detection component in any of Examples 9-13 is configured to detect an intersecting roadway by detecting a driving surface that connects the current roadway to a one or more of a driveway, parking lot, or cross street.

In Example 15, the notification component in any of Examples 9-14 is configured to store the indication of the location and direction by uploading to a remote storage location accessible over a network.

In Example 16, the system in any of Examples 9-15 further includes a location component and a drive history component. The location component is configured to determine a current location of the vehicle. The drive history component is configured to: retrieve drive history data from the remote storage location for the current location, wherein the drive history data indicates a location or direction of intersecting roadways near the current location; and broadcast the location or direction of intersecting roadways near the current location to one or more vehicle controllers of an automated driving system or driving assistance system.

In Example 17, system of Example 16 further includes a route component configured to processing the location or direction of the intersecting roadways to determine a route for the vehicle or detect a point of interest for the vehicle or a passenger.

Example 18 is computer readable storage media storing instructions that, when executed by one or more processors, cause the one or more processors to receive perception data from at least two sensors, the at least two sensors comprising a rear facing camera of a vehicle. The perception data includes information for a region behind the vehicle on a current roadway on which the vehicle is located. The instructions cause the one or more processor to detect, based on the perception data, an intersecting roadway connecting with the current roadway. The instructions cause the one or more processor to store an indication of a location and a direction of the intersecting roadway with respect to the current roadway.

In Example 19, detecting the intersecting roadway in Example 18 includes detecting one or more of: a gap in roadway markings, a break in a shoulder for the current roadway, or a variation or break in curb or barrier height.

In Example 20, storing the indication of the location and direction in any of Examples 18-19 includes uploading to a remote storage location accessible over a network. The instructions further cause the one or more processors to: determine a current location of the vehicle; retrieve drive history data from the remote storage location for the current location, wherein the drive history data indicates a location or direction of intersecting roadways near the current location; and broadcast the location or direction of intersecting roadways near the current location to one or more vehicle controllers of an automated driving system or driving assistance system.

Example 21 is a system or device that includes means for implementing a method, system, or device as in any of Examples 1-20.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A method comprising:

receiving perception data from at least two sensors of a vehicle that generate different data types, the at least two sensors comprising a rear facing camera and at least one of a light detection and ranging (LIDAR) system or a radar system, wherein the perception data comprises information for a current roadway on which the vehicle is located;

generating fused data based on the perception data using weighted averages for the different data types;

detecting, based on the fused data, an intersecting roadway connecting with the current roadway; and providing an indication of a location and a direction of the intersecting roadway with respect to the current roadway to an automated driving system or driver assistance system, whereby the automated driving system or driver assistance system actuates one or more vehicle controllers based on the indication.

2. The method of claim 1, wherein detecting the intersecting roadway comprises detecting one or more of: a gap in roadway markings, a break in a shoulder for the current roadway, or a variation or break in curb or barrier height.

3. The method of claim 1, wherein detecting the intersecting roadway comprises detecting using a deep neural network, and wherein generating the fused data further comprises modifying raw perception data to match a data format expected by the deep neural network.

4. The method of claim 1, wherein the at least two sensors comprise the rear facing camera, the LIDAR system, the radar system, an ultrasound sensing system, and an infrared camera system.

5. The method of claim 1, wherein the direction indicates a side of the current roadway on which the intersecting roadway is located.

6. The method of claim 1, further comprising storing the indication of the location and the direction of the intersecting roadway by uploading the indication to a remote storage location accessible over a network.

7. The method of claim 6, further comprising:

determining a current location of the vehicle;

retrieving drive history data from the remote storage location for the current location, wherein the drive history data indicates a location or direction of intersecting roadways near the current location; and broadcasting the location or direction of intersecting roadways near the current location to one or more vehicle controllers of an automated driving system or driving assistance system.

8. The method of claim 7, further comprising processing the location or direction of intersecting roadways to determine a route for the vehicle or detect a point of interest for the vehicle or a passenger.

9. A system comprising:

two or more sensors of a vehicle that generate different data types, the two or more sensors comprising a rear facing camera and at least one of a light detection and ranging (LIDAR) system or a radar system;

a computing system comprising a processor configured to perform the following:

receive perception data from the two or more sensors, wherein the perception data comprises information for a region behind the vehicle on a current roadway on which the vehicle is located;

generate fused data based on the perception data using weighted averages for the different data types;

detect, based on the fused data, an intersecting roadway connecting with the current roadway;

determine a driving maneuver for the vehicle based on an indication of a location and a direction of the intersecting roadway with respect to the current roadway; and actuate one or more controllers of the vehicle to execute the driving maneuver.

10. The system of claim 9, wherein the computing system comprising the processor is configured to detect the intersecting roadway by detecting one or more of: a gap in roadway markings, a break in a shoulder for the current roadway, or a variation or break in curb or barrier height.

11. The system of claim 9, wherein the computing system comprising the processor is configured to detect the intersecting roadway by detecting using a deep neural network to process at least a portion of the perception data.

12. The system of claim 9, wherein the two or more sensors comprise the rear facing camera, the LIDAR system, the radar system, an ultrasound sensing system, and an infrared camera system.

13. The system of claim 9, wherein the computing system comprising the processor is configured to detect the direction, wherein the direction indicates a side of the current roadway on which the intersecting roadway is located.

14. The system of claim 9, wherein the computing system comprising the processor is configured to detect an intersecting roadway by detecting a driving surface that connects the current roadway to one or more of a driveway, parking lot, or a cross street.

15. The system of claim 9, wherein the computing system comprising the processor is configured to store the indication of the location and the direction of the intersecting roadway by uploading the indication to a remote storage location accessible over a network.

16. The system of claim 15, wherein the computing system comprising the processor is further configured to:

determine a current location of the vehicle; and retrieve drive history data from the remote storage location for the current location, wherein the drive history data indicates a location or direction of intersecting roadways near the current location; and broadcast the location or direction of intersecting roadways near the current location to one or more vehicle controllers of an automated driving system or driving assistance system.

17. The system of claim 16, wherein the computing system comprising the processor is further configured to process the location or direction of the intersecting roadway to detect a point of interest for the vehicle or a passenger.

18. Non-transitory computer readable storage media storing instructions that, when executed by one or more processors, cause the one or more processors to:

receive perception data from at least two sensors of a vehicle that generate different data types, the at least two sensors comprising a rear facing camera and at least one of a light detection and ranging (LIDAR) system or a radar system, wherein the perception data comprises information for a region behind the vehicle on a current roadway on which the vehicle is located;

generate fused data based on the perception data using weighted averages for the different data types;

detect, based on the fused data, an intersecting roadway connecting with the current roadway; and provide an indication of a location and a direction of the intersecting roadway with respect to the current roadway to an automated driving system or driver assistance system, whereby the automated driving system or driver assistance system actuates one or more vehicle controllers based on the indication.

19. The non-transitory computer readable storage media of claim 18, wherein the instructions cause the one or more processors to detect the intersecting roadway by detecting one or more of: a gap in roadway markings, a break in a shoulder for the current roadway, or a variation or break in curb or barrier height.

20. The non-transitory computer readable storage media of claim 18, wherein the instructions further cause the one or more processors to:

store the indication of the location and direction by uploading to a remote storage location accessible over a network, determine a current location of the vehicle;

retrieve drive history data from the remote storage location for the current location, wherein the drive history data indicates a location or direction of intersecting roadways near the current location; and broadcast the location or direction of intersecting roadways near the current location to one or more vehicle controllers of an automated driving system or driving assistance system.

* * * * *